(12) United States Patent
Lin et al.

(10) Patent No.: US 8,005,319 B2
(45) Date of Patent: Aug. 23, 2011

(54) METHOD FOR DIGITALLY MAGNIFYING IMAGES

(75) Inventors: Jian-Hua Lin, Hangzhou (CN); Jin Wang, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 939 days.

(21) Appl. No.: 11/902,548

(22) Filed: Sep. 24, 2007

(65) Prior Publication Data

US 2009/0079764 A1      Mar. 26, 2009

(51) Int. Cl.
*G06K 9/32* (2006.01)
(52) U.S. Cl. ....................................................... 382/299
(58) Field of Classification Search .................. 382/276, 382/299, 308, 173, 180
See application file for complete search history.

Primary Examiner — Brian Q Le
Assistant Examiner — Edward Park
(74) Attorney, Agent, or Firm — Bacon & Thomas, PLLC

(57) ABSTRACT

A method for digitally magnifying images applied to an electronic device includes the steps of: reading in a preview image inputted into the electronic device; executing a 2-fold image magnifying process to the preview image; executing a fuzziness removing process to the preview image; segmenting the preview image into a background area and a text area, executing a correspondingly text strengthening process to the text area; and determining if the preview image is magnified up to a predetermined amplification factor; if yes, outputting the preview image after being magnified to a display screen for displaying the preview image; and otherwise, going back to re-execute the 2-fold image magnifying process to the magnified preview image, and then executing the fuzziness removing process and the text strengthening process, in order to generate the preview image magnified about 4-fold or more.

4 Claims, 7 Drawing Sheets

METHOD FOR DIGITALLY MAGNIFYING IMAGES

FIELD OF THE INVENTION

The present invention relates to a method for magnifying images, and more particularly to a method for digitally magnifying images applied to an electronic device having an image capturing element so as to efficiently remove the unclear and shaking problems of images, which are captured and digitally magnified by the electronic device, caused by high-speed moving and vibrating of the image capturing element, to lower the interference of random noise signals, and to provide more stable and clearer images.

BACKGROUND OF THE INVENTION

Presently, with the advance of medical technologies and the improvement of life qualities, human life spans are increasingly elongated, resulting in serious problems relating to aging society. Especially, with the increase of age, when one reaches such as 40 years old or more, the presbyopic problem will be gradually apparent. Thus, a magnifier or a pair of presbyopic glasses (i.e. reading glasses) is an essentially important tool for him to read books or letters, browse homepages, or view a display screen in a short distance. Otherwise, the deterioration of eyesight may cause the fatigue of eyes, resulting in effecting one's working efficiency. Moreover, the dim eyesight may cause a faint discomfort, resulting in effecting the quality of one's daily life.

Recently, with the advance of digital photography, various electronic devices (such as digital cameras, digital video cameras, notebook computers, mobile phones, and PDAs) provided with a digital image capturing element (such as a CCD or CMOS) are continuously developed, wherein the image quality of the digital image capturing element is continuously enhanced, the entire volume of the electronic device is continuously miniaturized, and the selling price thereof is continuously lowered down, so that it is advantageous to increase the market share of the electronic devices provided with the digital image capturing element. In consideration of the increasing trend of middle ages and old ages, it is necessary to consider the possible problems, which the middle ages and the old ages may face, as an important factor when manufacturers design and develop the electronic devices, in order to satisfy the needs of different ages.

For example, referring now to FIG. 1, a traditional digital magnifier which is commercially available and portable is illustrated, wherein the digital magnifier designated by numeral 10 has a size similar to a normal computer mouse, and is provided with an image capturing element (such as a CCD or CMOS, as shown in FIG. 1). The image capturing element of the digital magnifier 10 can be used to capture a preview image (such as a text image of a book or a magazine 12), magnify the captured image, and transmit the magnified image into a terminal apparatus 11 (such as a personal computer or a television) connected to the digital magnifier 10. Then, the terminal apparatus 11 displays the content of the magnified image. However, the digital magnifier 10 is not only expensive, but also has a volume greater than that of a traditional magnifier or traditional presbyopic glasses. When the digital magnifier 10 is used, it must be connected to the terminal apparatus 11, resulting in inconvenient usage. Hence, many old ages affording the digital magnifier 10 may still select to directly hang the traditional presbyopic glasses or the traditional magnifier on his/her neck for convenient usage, if necessary. As described above, although the commercially-available portable digital magnifier 10 has more and better functions, the digital magnifier 10 still can not satisfy actual needs of general middle ages and old ages. As a result, it is an important subject for related design houses and manufacturers of various electronic devices to think how to develop a portable electronic device to replace the traditional presbyopic glasses or the traditional magnifier whereby the middle ages and the old ages having the presbyopic problem read books or letters, browse homepages, or view a display screen can directly and conveniently read an magnified text image.

In addition, due to the improvements of text and figure recognition technologies in recent years, various electronic devices installed with a text and figure recognition software are continuously developed, in order to satisfy the needs of different consumers. As to traditional recognition software installed in commercially-available optical character recognition (OCR) devices, bar code recognition (BCR) devices, or business card recognition (Biz card) devices, text recognition software seriously demands the quality of inputted images while bar code recognition software and business card recognition software are very sensitive to the size of inputted text images. If the size of text images is smaller than a predetermined size value, the recognition rate thereof will be substantially lowered down to the situation that even no any text image can be recognized. Moreover, the traditional bar code recognition software also seriously demands the minimum width, height, and pitch of bar codes. If an inputted image of a bar code can not fit the foregoing demands, the recognition rate thereof will be substantially lowered down to the situation that even no bar code can be recognized. Furthermore, it is not ensured that an image captured by an image capturing element of the traditional recognition device can always fit the demands of the recognition software of the traditional recognition device, while the captured image generally includes various noise signals, resulting in lowering the recognition rate. Therefore, it is an important subject for related design houses and manufacturers of various electronic devices to think how to efficiently remove the noise signals existing in the captured image, in order to provide a high-quality image that is easy to be recognized by the recognition software.

It is therefore tried by the inventor to develop a method for digitally magnifying images to solve the problems existing in the traditional method for digitally magnifying images, wherein the difference therebetween is to execute a video stabilizing process, a noise signal removing process, a fuzziness removing process, and a text strengthening process to images during image magnification, so that the processed images will be clearer for facile reading or suitably used to other applications.

SUMMARY OF THE INVENTION

A primary object of the present invention is to provide a method for digitally magnifying images, which is applied to an electronic device comprising or connected to an image capturing element, so that the electronic device can execute a video stabilizing process to a preview image real-time inputted by the image capturing element, calculate the motion of the image capturing element according to a plurality of real-time inputted preview images, and execute a fitting process to the current preview image and the plural previous preview images, so as to efficiently remove the unclear and shaking problems of images caused by high-speed moving and vibrating of the image capturing element, and to lower the interference of random noise signals, for the purpose of providing more stable and clearer images.

A secondary object of the present invention is to provide a method for digitally magnifying images, which is used to execute a noise signal evaluating process to the preview image by the electronic device after executing the video stabilizing process, so that the preview image can be segmented into a text area and a background area, in order to dynamically evaluate a distribution range of noise signals according to a segmentation result of the text area and the background area.

A third object of the present invention is to provide a method for digitally magnifying images, which is used to execute an image magnifying process to the preview image by the electronic device after executing the noise signal evaluating process, wherein the preview image can be magnified about 2-fold according to an anti-aliased fast double amplification algorithm, in order to prevent from the aliasing problem of edges of the texts.

A fourth object of the present invention is to provide a method for digitally magnifying images, which is used to execute a noise signal removing process to the preview image by the electronic device after executing the image magnifying process, wherein when background noise signals of the preview image is removed, character points of texts (such as the point of English letter "i") can be efficiently protected from being removed.

A fifth object of the present invention is to provide a method for digitally magnifying images, which is used to execute a fuzziness removing process to the preview image by the electronic device after executing the noise signal removing process, wherein the preview image is processed by a fuzzy kernel template according to a fast deconvolution algorithm, in order to prevent from the fuzzy problem of the edges of the texts caused by inaccurately focusing of the image capturing element and magnifying the texts. Meanwhile, the fast deconvolution algorithm is speeded up according to an integral image means, so that the electronic device can provide a speed high enough to immediately finish the image magnifying process.

A sixth object of the present invention is to provide a method for digitally magnifying images, which is used to execute a partial text strengthening process to the preview image by the electronic device after executing the fuzziness removing process, wherein the preview image is segmented into a background area and a text area according to a peripherally statistic data of a text, and the text area is correspondingly strengthened based on a dynamic threshold value, so that a text content of the preview image inputted after being magnified 2-fold will be sharper and the edges of the texts will be smoother.

A seventh object of the present invention is to provide a method for digitally magnifying images, which is selectively used to re-execute the foregoing processes to the preview image according to actual needs after the preview image is magnified 2-fold, wherein the foregoing processes comprise the 2-fold image magnifying process, the noise signal removing process, the image fuzziness removing process, and the partial text strengthening process, so as to output a 4-fold or higher-fold preview image. As a result, the method of the present invention can not only provide a function of a digital magnifier, but also efficiently reduce or remove various interference factors (such as vibrations, noise signals, uneven illumination, inaccurate focusing, fuzziness, etc.), so that the magnified text images will provide more stable and clearer visual effect.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention relates to a method for digitally magnifying (i.e. zooming) images applied to an electronic device comprising or connected to an image capturing element. In a preferred embodiment of the present invention, the electronic device is preferably a mobile phone provided with the image capturing element and a display screen, wherein the image capturing element is an image inputting apparatus used to capture images, and the display screen is an image outputting apparatus used to display the images. As a result, when a user carries the mobile phone (i.e. the electronic device), the mobile phone can be used to real-time capture the images via the image capturing element. Meanwhile, after the image is magnified by the method of the present invention, the magnified image can be directly displayed on the display screen of the mobile phone without adding any auxiliary hardware on the mobile phone. In other words, the mobile phone (i.e. the electronic device) can be used as an auxiliary reading tool to help visual impaired users for the purpose of digitally magnifying images. However, the present invention is not limited by the preferred embodiment of the mobile phone, and it is understood that the method of the present can also be applied to various electronic devices directly or indirectly installed with or connected to the image capturing element (such as digital cameras, digital video cameras, PDAs, desktop computers, or notebook computers) invention for capturing, digitally magnifying, and displaying images, in order to help users or other electronic devices to recognize or read figures or texts.

Figure 5:
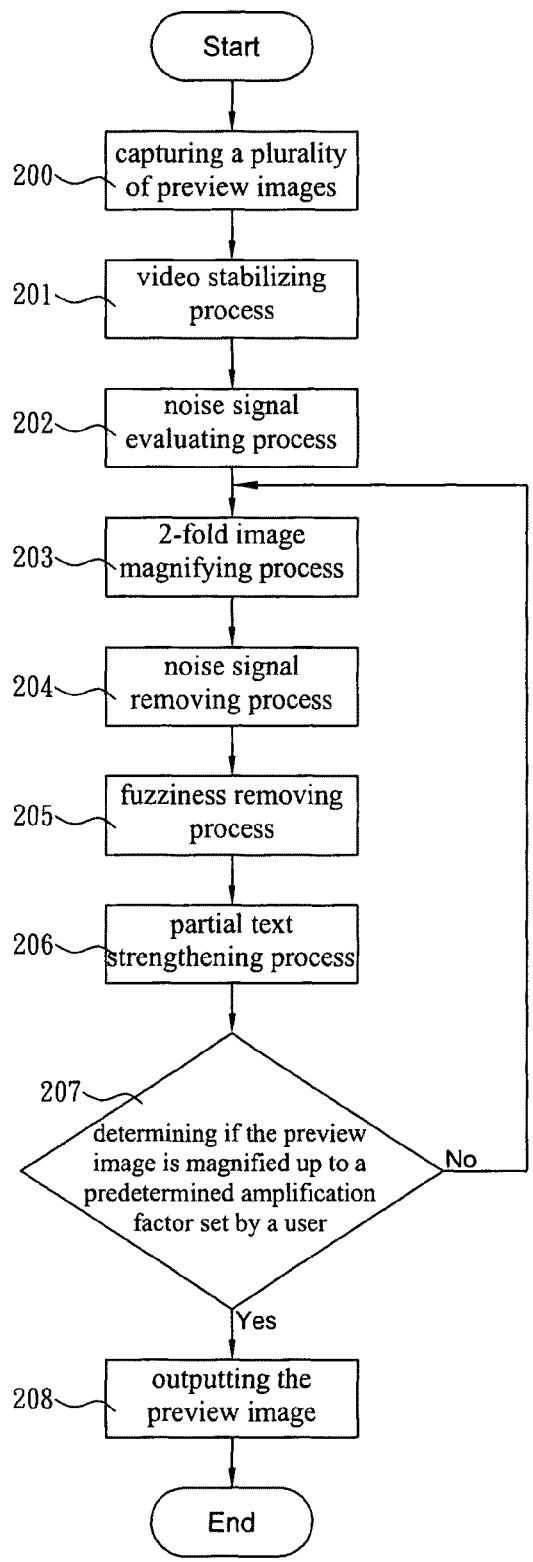
FIG. 5 is a flowchart of a method for digitally magnifying images according to a preferred embodiment of the present invention.

Furthermore, when traditional electronic devices installed with or connected to an image capturing element (such as mobile phones) are used to preview images, there are various interference factors (such as vibrations of the mobile phones, uneven illumination, inaccurate focusing, fuzziness, etc.). Thus, if the images are magnified according to a traditional bilinear interpolation amplification algorithm, the interference factors will be magnified in proportion to the magnified ratio of the images, so that the magnified images still fail to provide better visual effect. As a result, according to the method of the present invention, when the electronic device is used to magnify real-time captured images, the present invention further provides additional processes, such as a video stabilizing process, a noise signal removing process, a fuzziness removing process, and a text strengthening process. As a result, the method of the present invention can not only provide a function of a digital magnifier, but also efficiently reduce or remove various interference factors (such as vibrations, noise signals, uneven illumination, inaccurate focusing, fuzziness, etc.), so that the magnified text images will provide more stable and clearer visual effect. Referring now to FIG. 5, a flowchart of a method for digitally magnifying images according to a preferred embodiment of the present invention is illustrated. As shown, the method is applied to the electronic device capable of executing digitally magnifying processes to the preview images real-time inputted from the image capturing element, wherein the digitally magnifying processes are described more detailed as following.

In a step 200, an image capturing element real-time captures a plurality of preview images;

In a step 201, a video stabilizing process is executed by calculating the motion of the image capturing element according to the plurality of preview images real-time captured by the image capturing element, and executing a fitting process to clear portions of the current preview image and corresponding clear portions of a plurality of the previous preview images, so as to efficiently remove the interference of random noise signals in the preview images caused by high-speed moving and vibrating of the image capturing element, for the purpose of providing a more stable and clearer preview image. According to the method of the present invention, the video stabilizing process is used to remove the interference of random noise signals in the preview images caused by high-speed moving and vibrating of the image capturing element, but the video stabilizing process is not the only one feature of the present invention, while those skilled in the art can apparently understand the video stabilizing process, so that the detailed description thereof will be omitted hereinafter.

In a step 202, a noise signal evaluating process is executed by automatically scanning all pixels of each of the whole preview images, and executing a mathematical segmentation calculation to the pixels, wherein a portion of the pixels with the adjacent pixels having the same color thereto of the whole preview image will be defined as a segment, so that the whole preview image will be segmented into a plurality of segments. Then, executing a mathematical classification calculation to each of the segments, wherein each of the segments will be merged with one of the adjacent segments having a minimum color difference, respectively, so as to segment each of the preview images into a text area and a background area, in order to dynamically evaluate a distribution range of noise signals according to a segmentation result of the text area and the background area. Generally, the variance of a normal text area is greater than that of a normal background area. Therefore, according to a preferred embodiment of the present invention, a means of dynamically evaluating the distribution range of noise signals is preferably to calculate the variance of each of the pixels of the preview images within a predetermined area having a predetermined size, and then to compare the variance with a predetermined threshold value. If the variance is greater than the predetermined threshold value, the area belongs to a text area; and if the variance is smaller than the predetermined threshold value, the area belongs to a background area. As a result, the present invention can efficiently segment each of the preview images into the text area and the background area. After the segmentation of the text area and the background area is done, the strength of noise signals in the text area can be defined as 0, and it is unnecessary to further execute a noise signal removing process to the text area. On the other hand, the variance of the background area can be used as a parameter of the strength of noise signals in the background area;

In a step 203, executing an image magnifying process: according to the method of the present invention, each of the preview images can be magnified about 2-fold according to an anti-aliased fast double amplification algorithm, in order to prevent from the aliasing problem of edges of the texts. It should be noted that the preview image can be magnified about 4-fold or more according to a gradually magnifying technology of the present invention, i.e. the 4-fold preview image is generated by magnifying a pervious basis of the 2-fold preview image and simultaneously executing a noise signal removing process, a fuzziness removing process, and a text strengthening process. Hence, the multi-fold magnified images processed by the method of the present invention can provide a visual effect more stable and clearer than that of traditional magnified images that are directly magnified once. Generally, there are three types of traditional amplification algorithms:

(a) Nearest neighbor interpolation algorithm: it is a simplest interpolation algorithm for magnifying pixels, wherein the color of each pixel of a new image is selected from the color of one pixel which is nearest to an original pixel of an original image. For example, if the original image is magnified about 200%, each one of original pixels will be magnified into 4 new pixels having the same color to the original pixel. Because the nearest neighbor interpolation algorithm may increase visible sawtooth edges of the image, it is not practicable to magnify the image by the interpolation algorithm;

(b) Bilinear interpolation algorithm: when using the bilinear interpolation algorithm, the value of a pixel of a new image is selected from the weighted average value of 4 pixels which are nearest to an original pixel of an original image. Thus, the bilinear interpolation algorithm is advantageous to create the image having smoother edge without visible sawtooth edges, for preventing from generating the visible sawtooth edges; and (c) Bicubic interpolation algorithm: it is a more complicated interpolation algorithm, wherein the value of a pixel of a new image is selected from the calculated value of 16 pixels which are nearest to an original pixel of an original image. Thus, the bicubic interpolation algorithm can not only provide higher accuracy, but also create the image having smoother edges than that of the bilinear interpolation algorithm. However, the bicubic interpolation algorithm needs more time to calculate the pixel value.

According to the method of the present invention, the anti-aliased fast double amplification algorithm is used. It is an amplification algorithm, which is apparently faster than the bilinear interpolation algorithm and can provide an amplification effect between the bilinear interpolation algorithm and the bicubic interpolation algorithm. In a preferred embodiment of the present invention, the anti-aliased fast double amplification algorithm comprises the steps of: firstly executing a column interpolation algorithm, and then executing a row interpolation algorithm, wherein the column interpolation algorithm is calculated as following: each column of an original image is interpolated into double new columns:

one column of the original image: . . . p1, p2, p3, p4 . . .

one new column after interpolation: . . . q12,q21,q23,q32, q34,q43 . . .

Therein, the values of q12, q21, q23, q32, q34, and q43 are respectively calculated by the following equations:

$$q12=(p1*3+p2)/4;$$

$$q21=(p2*3+p1)/4;$$

$q23=(p2*3+p3)/4;$ $q32=(p3*3+p2)/4;$ $q34=(p3*3+p4)/4;$ and $q43=(p4*3+p3)/4$

Then, according to the same calculation rule, executing the column interpolation algorithm to the last column and the next column of said column, respectively, so as to generate two new columns, respectively. Furthermore, according to the same calculation rule, finally executing the row interpolation algorithm, so as to finish the 2-fold magnification of the image. Because each pixel of the magnified image is interpolated from 4 adjacent pixels of the original pixel of the original image, it is advantageous to substantially reduce the saw-tooth edges. Meanwhile, because the anti-aliased fast double amplification algorithm comprises the column interpolation algorithm and the row interpolation algorithm, both of which are respectively executed, it is possible to simultaneously calculate a plurality of pixels according to the storage characteristic of the image, in order to efficiently enhance the magnification performance.

In a step 204, a noise signal removing process is executed. When the present invention executes the noise signal evaluating process, the preview image is efficiently segmented into the text area and the background area, and the strength of noise signals in the text area is defined as 0. Thus, when the noise signal removing process is executed, it is only necessary to the background area, and is unnecessary to the text area. Thus, character points of the text area (such as the point of English letter "i") can be efficiently protected from being removed. According to the method of the present invention, the noise signal removing process is not the only feature of the present invention, while those skilled in the art can apparently understand the noise signal removing process, so that the detailed description thereof will be omitted hereinafter.

In a step 205, a fuzziness removing process is executed. The preview image is processed by a fuzzy kernel template according to a fast deconvolution algorithm, in order to prevent from the fuzzy problem of the edges of the texts caused by inaccurately focusing of the image capturing element and magnifying the texts. Meanwhile, the fast deconvolution algorithm is speeded up according to an integral image means, so that the electronic device can provide a speed high enough to real-time finish the image magnifying process. When the fuzziness removing process is applied to a mobile phone of Nokia 6620 installed with a 32-bit RISC CPU (ARM-9, 150 MHz), the preview image can be processed up to a frame rate of 20 fps (frame per second). Generally, a convolution process is a common method for processing the preview image, wherein an inputted image is processed into an outputted image having a plurality of pixels, each of which is selected from a weighted average value of several pixels in a predetermined area of the imputed image. The weighted index of the weighted average value is defined by a function which is called convolution kernel. Taking a mathematical application as an example, if increasing the smoothness of a function $F(x)$ is desired, a common method is to execute a convolution process to the original function $F(x)$ and another function $G(x)$, wherein the function $G(x)$ is called the convolution kernel which is substantially equal to an integration process of the original function $F(x)$. The fuzzy kernel template of the present invention means a convolution kernel for executing a convolution process to the preview image, wherein the convolution kernel may be a fuzzy kernel if the processed image is fuzzy after finishing the convolution process, while a template corresponding to the fuzzy kernel is defined as a fuzzy kernel template. Generally, a convolution procedure is similar to a multiplication procedure, while a deconvolution procedure is similar to a division procedure. When executing the division procedure once, repeated multiplication procedures are needed to achieve an approaching purpose. Meanwhile, the detail calculation of the deconvolution procedure is also similar to that of the division procedure, i.e. it needs repeated convolution procedures to calculate a deconvolution result. Taking a normal convolution algorithm as an example, when executing a convolution process to the preview image, each of pixels of the preview image will be processed by calculating a product of several adjacent pixels in a predetermined area and a weighted index of the convolution kernel template, and then adding all of the products. It is supposed that the convolution kernel template is a Gaussian smoothing template as following:

| | | |
|---|---|---|
| 1/9 | 1/9 | 1/9 |
| 1/9 | 1/9 | 1/9 |
| 1/9 | 1/9 | 1/9 |

At this time, the convolution process needs to calculate the sum of the weighted values of the current pixel and 8 adjacent pixels, each of which are multiplied by the weighted index ⅑, respectively. As described above, the larger the convolution kernel template becomes, the more calculations the convolution process comprises. Equally, the deconvolution process will have more calculations. In view of the foregoing problem, the present invention uses the integral image technology for speeding up the fast deconvolution algorithm. As a result, if a predetermined area is square, it only needs 4 times of addition calculations to calculate the sum of all pixels in the predetermined square area, so as to efficiently solve the loading problem of calculating the sum of the predetermined area. In a preferred embodiment of the present invention, the fuzzy kernel template is limited to an average template, wherein all weighted values in the fuzzy kernel template are the same. Thus, when calculating the convolution, it only needs to add all pixels in the predetermined area and execute the integral image technology, to substantially enhance the convolution speed. Similarly, the deconvolution speed will be substantially enhanced, too.

In a step 206, a partial text strengthening process is executed The preview image is efficiently segmented into the text area and the background according to a peripherally statistic data of a text, and the text area is correspondingly strengthened based on a dynamic threshold value, so that a text content of the preview image inputted after being magnified 2-fold will be sharper and the edges of the texts will be smoother. According to the present invention, the dynamic threshold value is commonly constructed by a mean variance of a gray value of the current pixel of the preview image and an average gray value of several pixels adjacent to the current pixel in a predetermined area. The foregoing parameters are used to adjust iteration times and a strength index of the deconvolution, so as to carry out a clear and sharp effect of texts. Furthermore, according to the difference between the current gray value and the average gray value, a probability value of the current pixel in relation to the adjacent pixels in the predetermined area can be calculated. Then, the probability value can be used as a weighted index to adjust the brightness of the current pixel, so as to achieve the purpose of smoothening the edges of the texts.

In a step 207, whether the preview image is magnified up to a predetermined amplification factor set by a user is determined. If yes, the procedure goes to a step 208; and if no, it goes back to the step 203 to re-execute the 2-fold image magnifying process to the preview image, and then execute the noise signal removing process, the fuzziness removing process, and the partial text strengthening process, in order to generate a preview image magnified about 4-fold or more.

In a step 208, the preview image after being magnified is outputted to a display screen for displaying the preview image. As a result, the method of the present invention can not only provide a function of a digital magnifier, but also efficiently reduce or remove various interference factors (such as vibrations, noise signals, uneven illumination, inaccurate focusing, fuzziness, etc.), so that the magnified images will provide more stable and clearer visual effect.

As described above, the present invention has been described with the foregoing preferred embodiment thereof and it is understood that many changes and modifications to the described embodiment can be carried out without departing from the scope and the spirit of the invention. For example, when the preview image is magnified about 4-fold or more, steps of the foregoing processes can be increased, deleted, or adjusted, only if the processes can magnify the preview image about 4-fold or more according to a gradually magnifying technology, i.e. the 4-fold preview image is generated by magnifying a pervious basis of the 2-fold preview image and simultaneously executing the fuzziness removing process and the text strengthening process.

Figure 2:
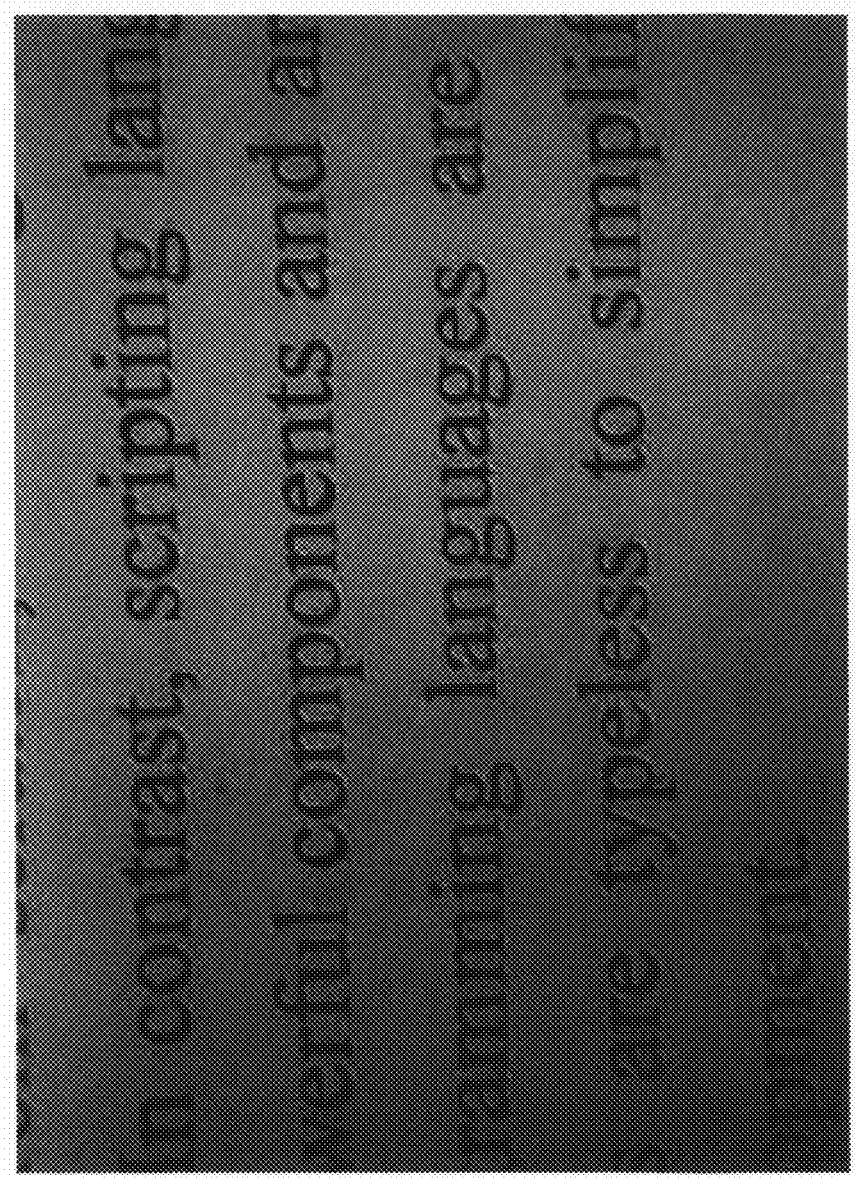
FIG. 2 is a top view of an original text image before being magnified.
Figure 3:
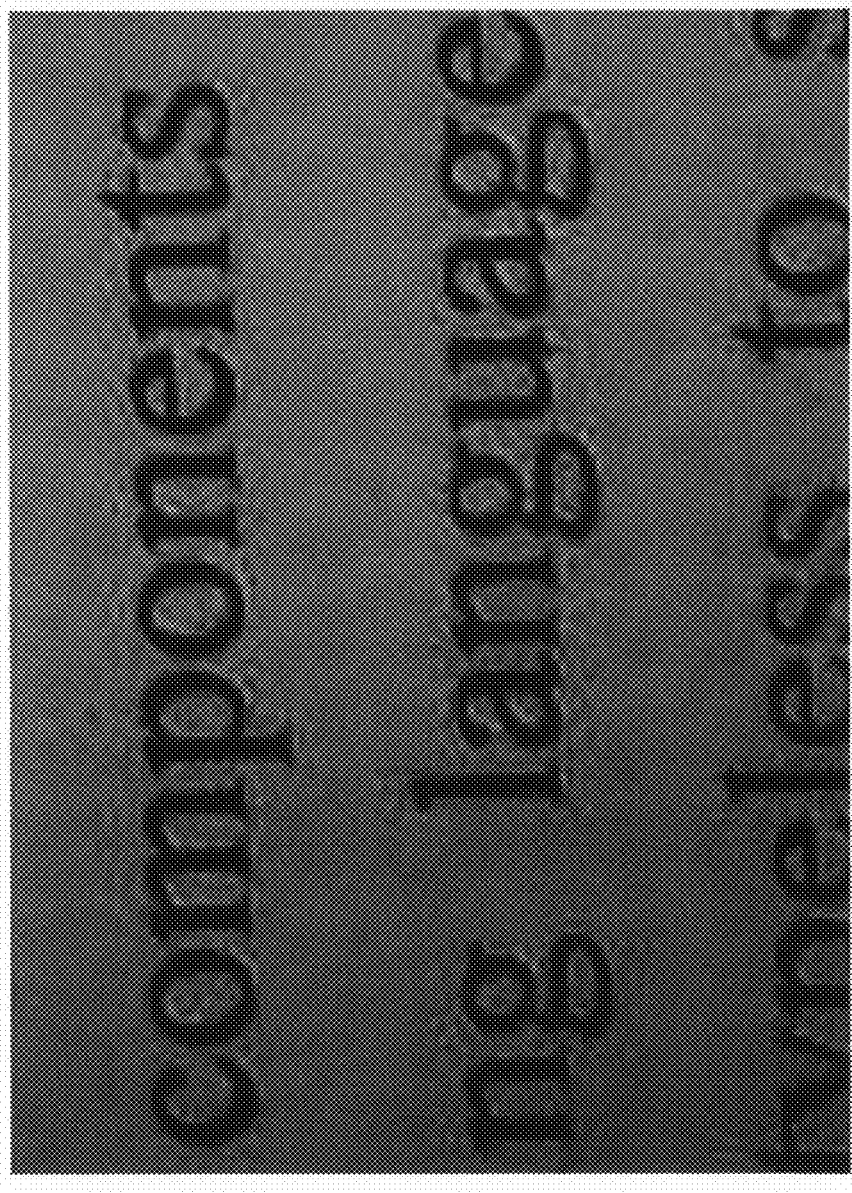
FIG. 3 is a top view of the text image of FIG. 2 after being magnified 2-fold by the traditional digital magnifier of FIG. 1.
Figure 4:
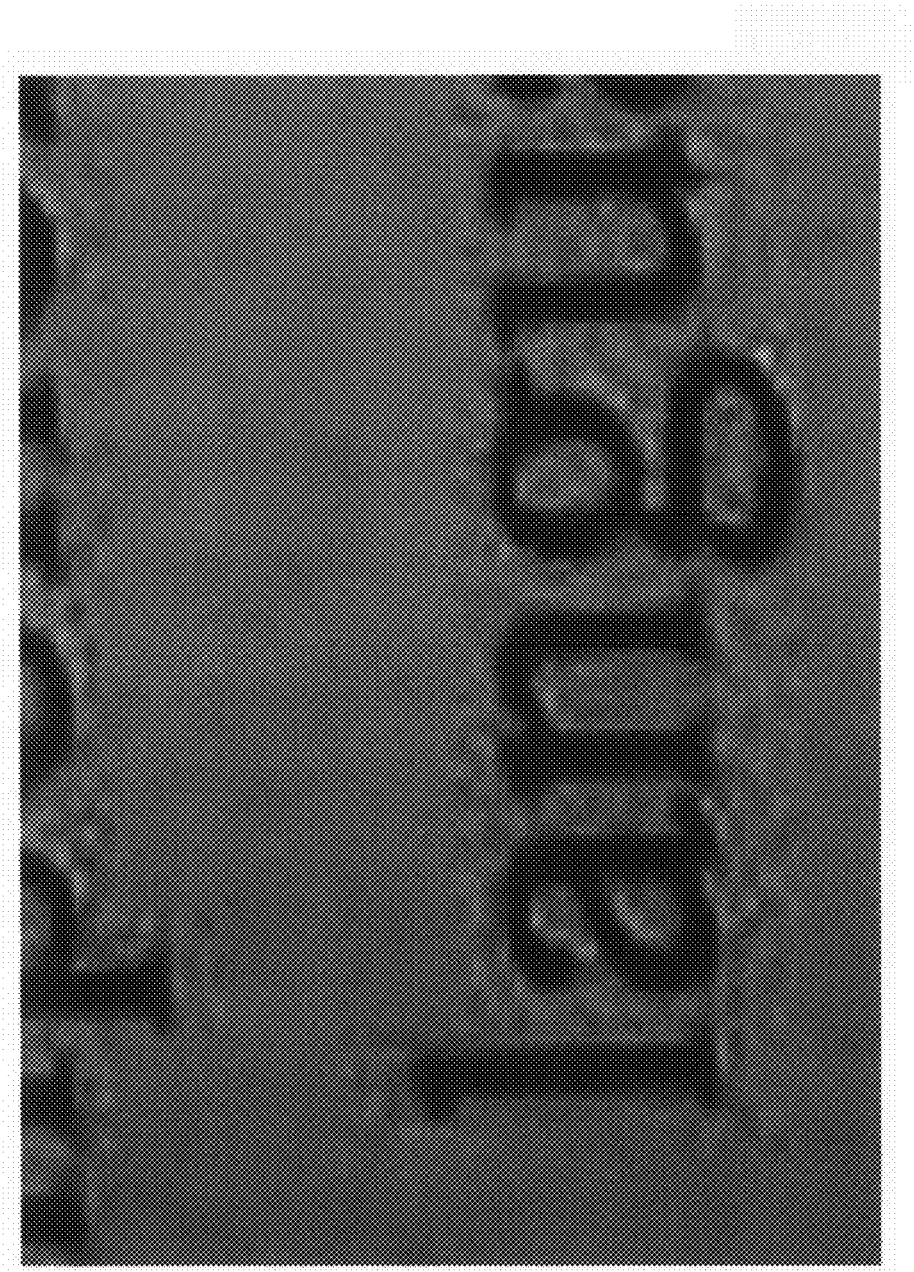
FIG. 4 is a top view of the text image of FIG. 2 after being magnified 4-fold by the traditional digital magnifier of FIG. 1.
Figure 6:
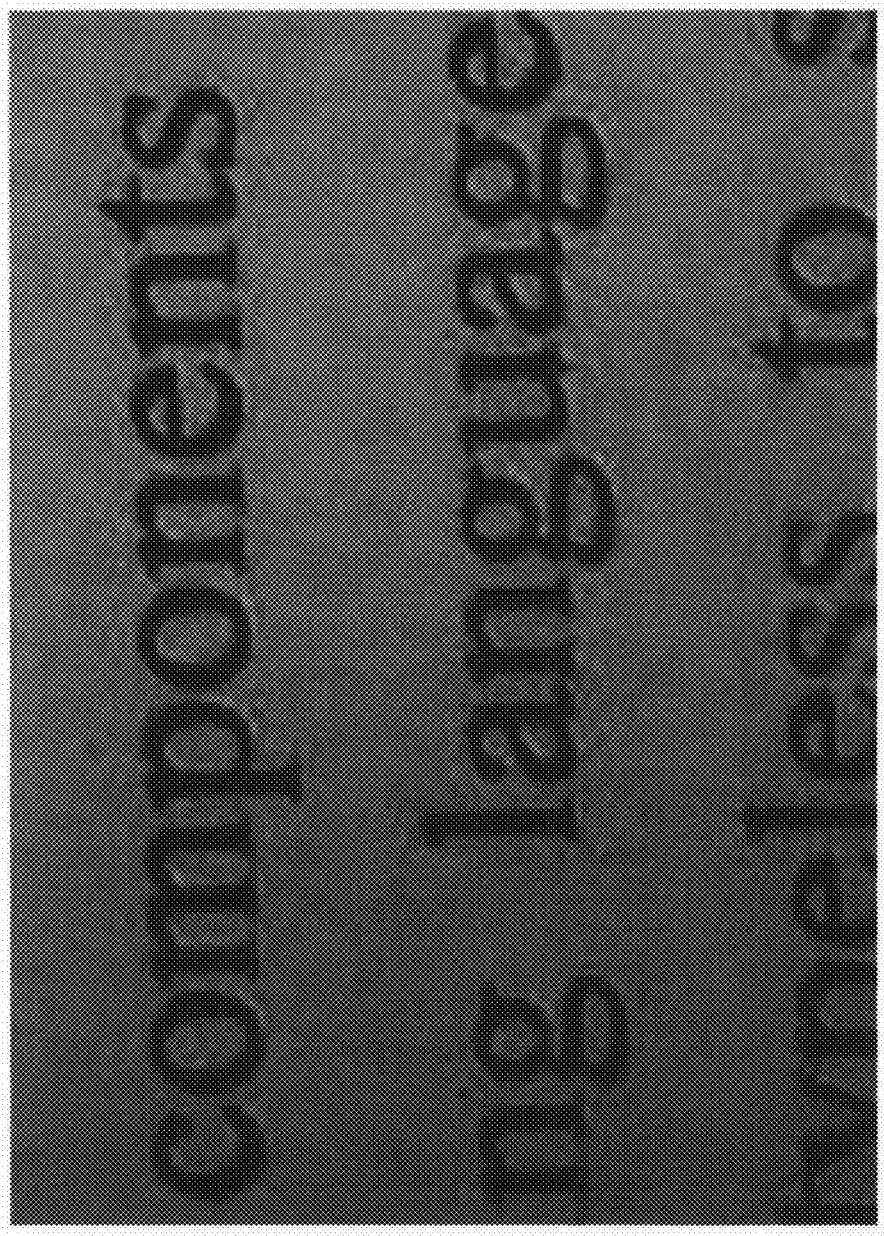
FIG. 6 is a top view of the text image of FIG. 2 after being magnified 2-fold by the method for digitally magnifying images according to the preferred embodiment of the present invention.
Figure 7:
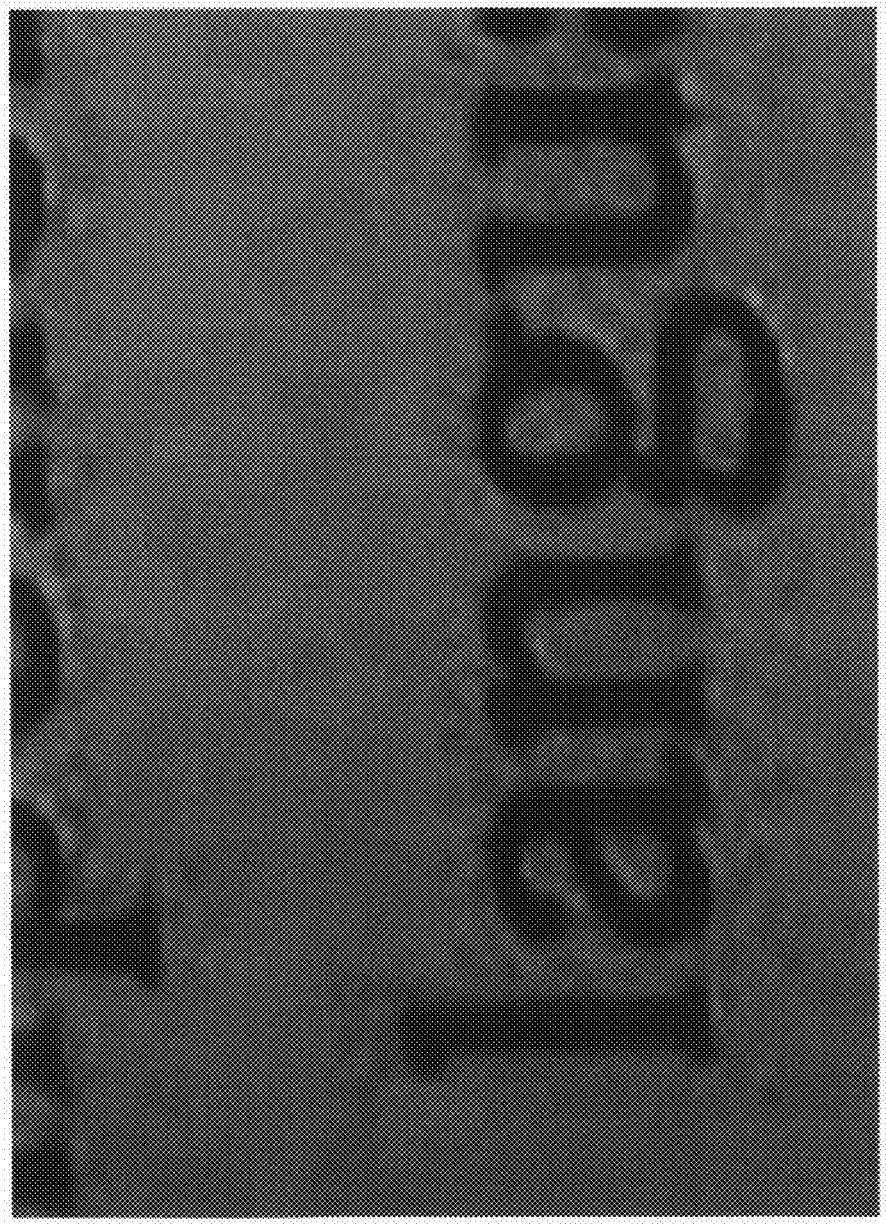
FIG. 7 is a top view of the text image of FIG. 2 after being magnified 4-fold by the method for digitally magnifying images according to the preferred embodiment of the present invention.

In the preferred embodiment of the present invention, the electronic device is used as a digital magnifier which can collect text data of newspapers, magazines, books, or letters via an image capturing element thereof, and then magnify the text data followed by displaying the text data on a display screen of the electronic device for a user to read. In comparison with a traditional digital magnifier calculated according to the bilinear interpolation algorithm, the traditional digital magnifier is used to magnify the text data as shown in FIG. 2 about 2-fold, so as to generate a magnified image as shown in FIG. 3. In addition, the magnified image can be also magnified 4-fold into a magnified image as shown in FIG. 4. Referring to the magnified images of FIGS. 3 and 4, it should be noted that the preview image includes more noise signals, and the edges of the texts are fuzzier. On the contrary, the method of the present invention can be used to magnify the text data as shown in FIG. 2 about 2-fold and 4-fold in turn, in order to generate a 2-fold magnified image as shown in FIG. 6 and a 4-fold magnified image as shown in FIG. 7 in turn, wherein the preview image only includes fewer noise signals for providing more stable and clearer text effect. Therefore, if the middle ages and old ages having the presbyopic problem can carry the electronic device of the present invention (such as a mobile phone, a digital camera, or a PDA), the electronic device can be used as a digital magnifier for reading newspapers, magazines, books, or letters, in order to carry out a function of a physical magnifier, so that it will be unnecessary for them to additionally carry the presbyopic glasses (i.e. reading glasses) or the magnifier.

Figure 1:
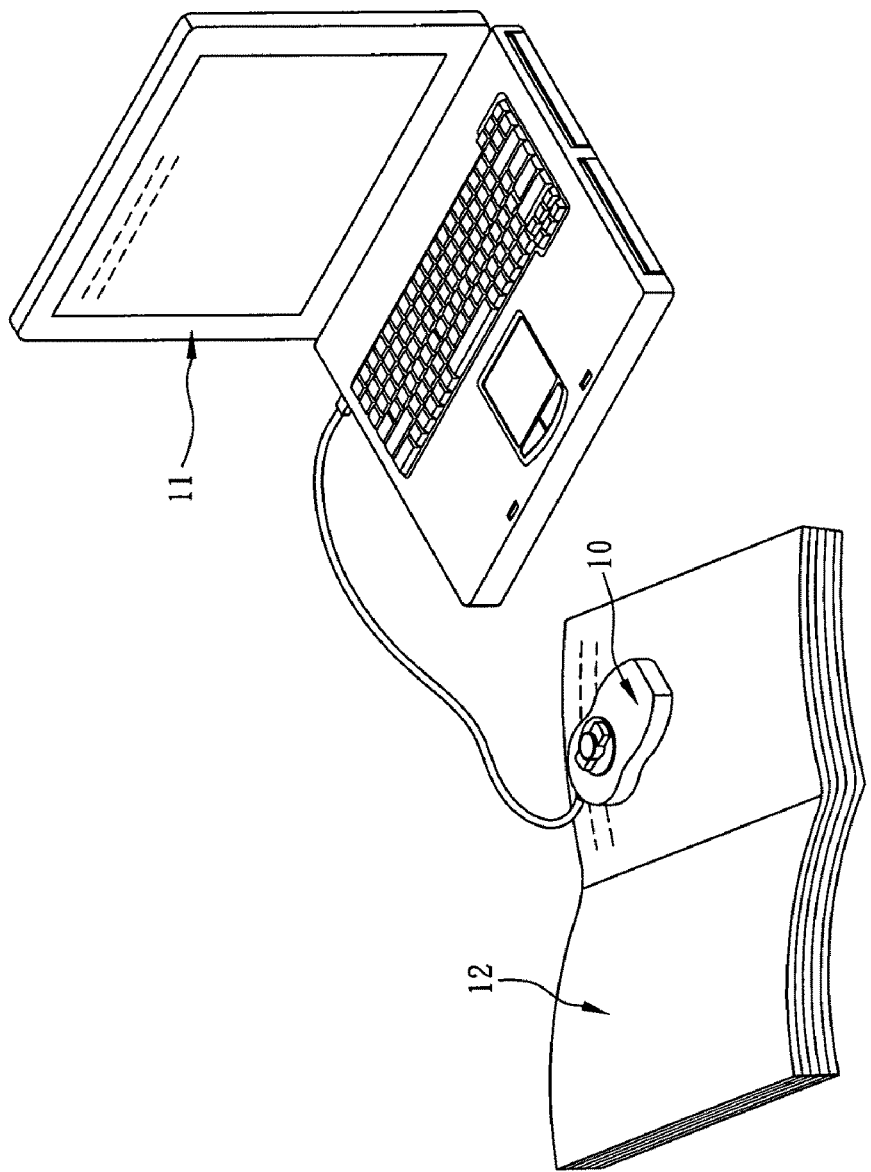
FIG. 1 is an operational view of a traditional digital magnifier.

In alternatively preferred embodiments of the present invention, the electronic device can be further installed with other traditional character recognition software selected from the group consisting of optical character recognition (OCR) software, bar code recognition (BCR) software, and business card recognition (Biz card) software. Thus, in operation, the electronic device can be firstly used to digitally magnify the content of texts or bar codes in an inputted image and remove noise signals therein according to the method of the present invention, and then the magnified image can be outputted to one of the character recognition software for recognizing the texts or the bar codes, so as to efficiently enhance the recognition capacity of the character recognition software. Moreover, the method of the present invention can be used as a software development kit (SDK) which can be applied to various electronic devices installed with various character recognition software of OCR, BCR, or Biz Card, so as to carry out a function of recognizing and reading the image or texts when it is necessary to magnify texts, bar codes, and symbols in related fields by following means:

(1) The method of the present invention can obtain data of newspapers or magazines via the image capturing element, and then output the data by linking to a computer via a data cable, in order to display the magnified data on a computer display. Although the foregoing operation mode can not be always carried out anywhere at any time, it is easier for a user to obtain more content with a higher amplification factor due to the computer display is apparently greater than a display screen of a normal mobile phone. Thus, the foregoing operation mode is suitable for the user to read the data in office or home, and the cost thereof is substantially lower than that of the traditional digital magnifier, such as the digital magnifier as shown in FIG. 1;

(2) The method of the present invention can be used as a SDK: the method and one traditional character recognition software (such as OCR, BCR, or Biz card software) can be commonly installed into a portable electronic device (such as a mobile phone, a digital camera, or a PDA), wherein the method of the present invention is defined as a pre-processing software to provide a clear image with enough resolution to be recognized before carrying out the traditional character recognition software, so as to enhance the success rate of character recognition;

(3) The method of the present invention can be used to magnify character templates of a mobile phone: because some types of mobile phones only provide a limited storage capacity, some character templates can not be stored as a vector diagram or a high-resolution bitmap (BMP). At this time, the method for digitally magnifying images according to the present invention can be used to magnify and process low-resolution character templates into high-resolution character templates, so as to efficiently save the storage space of the mobile phone and provide more characters with various sizes for use;

(4) The method of the present invention can be used to magnify a frame of a display screen: it is similar to a magnifier function of Windows system, but can provide a better magnifier effect than that of the Windows system. Especially, the magnified texts will be clearer and easier to be read, so that the method of the present invention can provide a better magnified visual effect than that of the Windows system for a computer user who needs to use the magnifier function; and (5) The method of the present invention can be used to magnify subtitles:

for a special application of magnifying the frame of the display screen, such as seeing a movie displayed on the display screen, the method for digitally magnifying images according to the present invention can be used to partially magnify the subtitles of the movie, so that the user with poor eyesight still can read the subtitles at a relatively long distance.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for digitally magnifying images applied to an electronic device, comprising:

reading in a preview image inputted into the electronic device;

executing a 2-fold image magnifying process to the preview image;

executing a fuzziness removing process to the preview image;

segmenting the preview image into a background area and a text area, and executing a correspondingly text strengthening process to the text area; and determining whether the preview image is magnified up to a predetermined amplification factor; when yes, outputting the preview image after being magnified to a display screen for displaying the preview image; otherwise, going back to re-execute the 2-fold image magnifying process to the magnified preview image, and then executing the fuzziness removing process and the text strengthening process, in order to generate the preview image magnified about 4-fold or more, and further comprising:

a noise signal evaluating process for segmenting the preview image into the text area and the background area, in order to dynamically evaluate a distribution range of noise signals according to a segmentation result of the text area and the background area, wherein a means of dynamically evaluating the distribution range of noise signals is to calculate a variance of each of the pixels of the preview images within a predetermined area, and then to compare the variance with a predetermined threshold value; when the variance is greater than the predetermined threshold value, the area belongs to the text area; and when the variance is smaller than the predetermined threshold value, the area belongs to the background area; after segmenting the preview images into the text area and the background area, the strength of noise signals in the text area is defined as 0, and the variance of the background area is used as a parameter of the strength of noise signals in the background area: and a noise signal removing process for removing noise signals in the background area.

2. The method for digitally magnifying images of claim 1, wherein the 2-fold image magnifying process of the preview image is executed according to an anti-aliased fast double amplification algorithm which comprises a column interpolation algorithm and a row interpolation algorithm, wherein each column of an original preview image is interpolated into double new columns according to the column interpolation algorithm, while each row of an original preview image is interpolated into double new rows according to the row interpolation algorithm; and then the column interpolation algorithm is executed to the last column and the next column of said column, respectively, to generate two corresponding new columns, respectively, while the row interpolation algorithm is executed to the last row and the next row of said row, respectively, to generate two corresponding new rows, respectively; so that the 2-fold image magnifying process of the preview image is finished.

3. The method for digitally magnifying images of claim 2, further comprising an integral image technology to speed up the fast deconvolution algorithm, wherein the fast deconvolution algorithm is used to process the preview image by a predetermined fuzzy kernel template, and the integral image technology is used to speed up the fast deconvolution algorithm.

4. The method for digitally magnifying images of claim 3, wherein the fuzzy kernel template is an average template and all weighted values in the fuzzy kernel template are the same.

* * * * *